Oct. 12, 1926.
H. E. VAN DERHOEF
MOTION PICTURE FILM
Filed Nov. 6, 1924
1,602,599
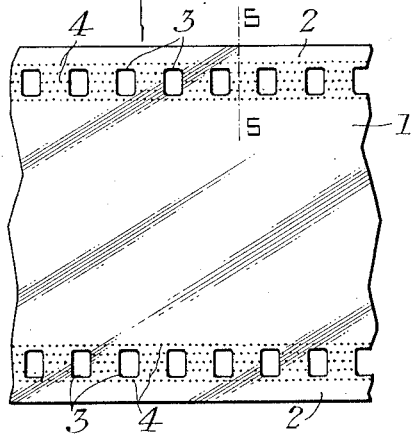
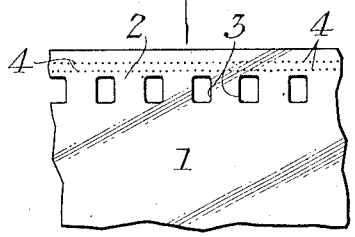
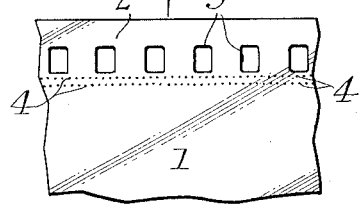
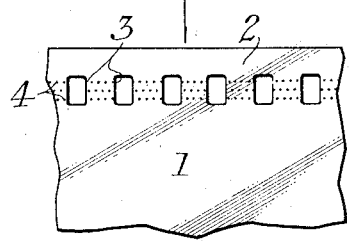
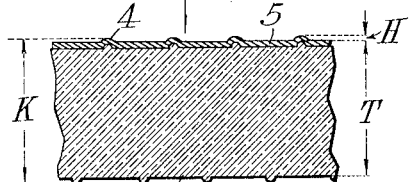
INVENTOR,
Henry E. Van Derhoef,
BY
R. L. Stinchfield
ATTORNEY.

Patented Oct. 12, 1926.

1,602,599

UNITED STATES PATENT OFFICE.

HENRY E. VAN DERHOEF, OF ROCHESTER, NEW YORK, ASSIGNOR TO EASTMAN KODAK COMPANY, OF ROCHESTER, NEW YORK, A CORPORATION OF NEW YORK.

MOTION-PICTURE FILM.

Application filed November 6, 1924. Serial No. 748,290.

This invention relates to motion picture film. One object of the invention is to provide a film, the durability of which is greatly increased. Another object of the invention is to lessen abrasion marks in the film during use. Still another object is to obtain said durability and lessened liability to abrasion without substantially interfering with the normal motion of the film on the customary sprockets and other film-advancing devices. Further objects will hereinafter appear.

In the drawing—

Fig. 1 is a fragmentary diagrammatic plan view, upon an enlarged scale, of a motion picture film embodying my invention;

Fig. 2 is a fragmentary diagrammatic plan view illustrating a different embodiment of my invention;

Figs. 3 and 4 are similar views showing still further modifications, and

Fig. 5 is a fragmentary section taken on the line 5—5 of Fig. 1, but on a larger scale.

When motion picture films are repeatedly projected they eventually become worn or torn so that they can not be further used. During use they also become abraded, the effects of this action showing in the pictures. It is highly desirable to increase the durability of the film both against wear and tear from repeated projections and against abrasion.

I have found that this extra durability may be obtained in a very large and unexpected amount by providing the film outside of its picture parts with closely adjacent low projections extending above a face of the picture portions of the film. I have likewise found that this result depends upon using only projections of proper size and arrangement. In general the projections should extend above a face of the picture portions a distance less than one-fourth the thickness of said portions. Where there are projections on both faces of the film, the added thickness, due to the projections, is less than one-half the thickness of the film. In the preferred embodiment of my invention the height of the projections is of the order of 5% of the thickness of the film, and where there are projections on both faces, the thickness plus the perforations is roughly 10% greater than the thickness of the film, say in the picture parts. In the case of films in wide use, the projections may thus be, for example, approximately 1/2000 of an inch in height above the general level of the film, thereby increasing the thickness of the film by 1/1000 of an inch where there are projections on both faces.

The projections which I have found best in producing the extra durability are much less in area than the areas of the perforations, being in fact of a lower order of magnitude. Moreover, they are spaced a much shorter distance apart than are the perforations. The spaces between projections are less than eight times the thickness of the film and preferably they are even closer than this limit. I have found that 1/30 of an inch is an excellent spacing for the multitude of minute projections. In general the projections are so small in area and height and are spaced such a small distance apart that a plurality of them may be located in the spaces between the perforations of the film. By properly selecting the indicated dimensions the projections do not interfere with the sprockets or other mechanism of the usual projection apparatus. Moreover, there is a minimum increase in diameter of the reels of film consistent with obtaining the extra durability.

My invention is of wide applicability in this art. While I shall describe illustrative embodiments of it, as applied to standard forms of motion picture film, it will be understood that the invention is not limited to use in such films, except as indicated in the appended claims. In Fig. 1 the picture portions of the film are indicated at 1 and the marginal portions are shown at 2. In such marginal portions are the usual perforations 3. Along the lines of the perforations are arranged a multitude of minute closely adjacent projections 4. It will be seen that these projections are preferably much smaller in area than the perforations 3 and are spaced apart a distance much smaller than the spaces between the perforations. Consequently a plurality of them may be located in the spaces between the perforations directly in line with the latter. Others may be located in longitudinally extended series parallel to the line of the perforations but spaced from the latter.

The height of these projections is vitally important. It is in general less than one-fourth the thickness of the film, the film, except for said projections, being of approximately uniform thickness, as will be understood by those skilled in the art. The projections may be located only upon one face of the film, or upon both faces, as indicated diagrammatically in Fig. 5. The effective thickness of the film due to the projections is thus less than one and one-half times the normal thickness of the film. In practice I find that it is especially useful to employ projections 4 which extend about 1/20 of the thickness of the film above a face of the latter, especially above a face of the picture part. Thus in Fig. 5 T represents the normal thickness of the film; K represents the increased thickness due to projections on both faces, and H indicates the height of one set of projections above the face from which they rise. Where thickness T is one used in commercial practice, the dimension H will usually be roughly 1/2000 of an inch. The gelatinous photographic layer 5 may be of any usual or preferred thickness.

While I prefer to arrange the projections along the perforations, as indicated in Fig. 1, useful variations are permissible, as shown in Figs. 2, 3, and 4. In Fig. 2 the projections 4 are wholly outside the line of perforations 3. In Fig. 3 they are wholly inside the line of perforations 3 but outside the picture part 1. In Fig. 4 the projections 4 are located only between the successive perforations 3.

My invention is applicable to positive or negative motion picture film, the projections being formed therein either before or after exposure, development, etc. When applied to the sensitized film before exposure, the effect of abrasion is lessened, because of the spacing function of my projections. But the most important effect is brought about by their presence when the finished motion picture positive film, bearing the completed pictures, is passed through projecting apparatus. It is here that the extra durabiliy is apparent. For example, it has been repeatedly found that the number of times that film bearing my projections will pass through a projector before breaking down is from 3 to 4 times greater than the number of times that the same kind of film without my projections will pass through the projector before breaking down under exactly parallel conditions. Projections which space the convolutions of motion picture film have heretofore been proposed, as in Patent No. 1,205,367, MacBride, Nov. 21, 1916. But the unexpected durability which I have obtained can not be produced by projections larger than the perforations when spaced large distances apart. The unexpected result is reached only when the projections are within a particular range of dimensions, as hereinabove described.

The projections may be produced in many different ways. At the present time the most convenient method is to knurl the film and thereby force out these minute projections from the surfaces of the film. Thus I have successfully carried out the invention by passing film between knurlers $\frac{3}{16}''$ wide with the perforations of the film coming centrally under the knurlers, thus bringing the knurled strip or lines of projections 4 from $\frac{1}{32}$ to $\frac{1}{16}''$ inside the extreme edges of the film, the latter being a standard product of $1\frac{3}{8}''$ width. This is given merely by way of example and other widths and other locations can be usefully employed, as hereinabove stated. Moreover, when working with films of different width than said standard, narrower knurled bands may be usefully placed along the line of the perforations. The height of the projections can be regulated by the depth and shape of cuts in the knurlers and the pressure employed when using them. The knurlers may bear against the gelatinous photographic layer 5 of the film, or against the uncoated cellulosic face of the film, or against both said faces. Where, as is customary, the film is provided with two sets of perforations, the knurling can readily be done along both lines of perforations simultaneously.

In the drawing, for the sake of clearness, the principal projections produced by knurling, for example, are indicated; but any connecting or intersecting lines made incidentally by knurling are omitted. Of course, the shapes of the projections can vary, the showing of them as circular being merely diagrammatic for convenience.

Having thus described my invention what I claim as new and desire to secure by Letters Patent is:

1. A motion picture film having, outside its picture parts, longitudinal portions thickened, relative to said picture parts, by means of closely adjacent low projections, the thickness of said longitudinal portions including said projections being less than one and one-half times the thickness of said picture parts, said film being at least three times more resistant to tearing in projection apparatus than similar film without said projections.

2. A motion picture film having marginal portions thickened relative to its picture parts by means of a multitude of closely adjacent minute projections, said portions including said projections being of the order of ten percent thicker than said picture parts, said film being at least three times more resistant to tearing in projection apparatus than similar film without said projections.

3. A motion picture film comprising a base of cellulosic material having a gelatinous photographic layer thereon, the marginal portions thereof having a multitude of minute closely adjacent integral projections, said portions including said projections being thicker than the picture parts of said film the difference in thickness being of the order of magnitude of one-thousandth of an inch, said film being at least three times more resistant to tearing in projection apparatus than similar film without said projections.

4. A motion picture film comprising outside its picture parts, longitudinal portions having closely adjacent projections which extend above a face of said picture parts a distance less than one-fourth the thickness of said picture parts, said film being at least three times more resistant to tearing in projection apparatus than similar film without said projections.

5. A motion picture film comprising marginal portions having a multitude of closely adjacent minute projections which extend above a face of said picture parts a distance of the order of magnitude of five percent of the thickness of said picture parts.

6. A motion picture film comprising a base of cellulosic material and a gelatinous photographic layer thereon, the marginal portions thereof having a multitude of minute closely adjacent integral projections which extend above a face of the picture portion of the film a distance of the order of magnitude of one two-thousandths of an inch.

7. A motion picture film comprising outside its picture parts, longitudinal portions having projections which extend above a face of said picture parts a distance less than one-fourth the thickness of said picture parts, and being spaced less than eight times said thickness from each other.

8. A motion picture film comprising marginal portions having a multitude of longitudinally arranged projections which extend above a face of the picture parts a distance of the order of magnitude of one two-thousandth of an inch, the distance between said projections being of the order of magnitude of one-thirtieth of an inch.

9. A motion picture film, having at least one series of spaced perforations outside its picture parts and having projections arranged along the line of said series of perforations, said projections extending above a face of said picture parts a distance less than one-fourth the thickness of said picture parts, there being a plurality of said projections in the spaces between successive perforations.

10. A motion picture film having a series of spaced perforations in each marginal portion, projections arranged along the line of each series of perforations, said projections extending above a face of the picture parts of the film a distance of the order of magnitude of one two-thousandth of an inch, each of said projections being of less area than the area of a perforation and there being a plurality of said projections in the spaces between successive perforations.

11. A motion picture film having at least one series of spaced perforations outside its picture parts and having rows of spaced projections along the line of said perforations, said projections extending above a face of said picture parts a distance of the order of magnitude of one two-thousandth of an inch, each of said projections being of less area than the area of a perforation and the projections of one row being staggered relative to the projections of the next row.

Signed at Rochester, New York, this 31st day of October, 1924.

HENRY E. VAN DERHOEF